United States Patent

[11] 3,612,929

| [72] | Inventor | Wolfgang Volkrodt<br>Muhlbach, Germany |
|---|---|---|
| [21] | Appl. No. | 859,284 |
| [22] | Filed | Sept. 19, 1969 |
| [45] | Patented | Oct. 12, 1971 |
| [73] | Assignee | Siemens Aktiengesellschaft<br>Berlin, Germany |
| [32] | Priority | Sept. 26, 1968 |
| [33] | | Germany |
| [31] | | P 17 88 066.9 |

[54] DEVICE FOR TEMPERATURE COMPENSATION IN ELECTRICAL MACHINES EXCITED BY PERMANENT MAGNETS
4 Claims, 8 Drawing Figs.

[52] U.S. Cl.................................................. 310/190, 310/256
[51] Int. Cl................................................... H02k 1/04
[50] Field of Search........................................ 310/90, 97, 154, 253, 256, 190, 191, 192, 193, 209

[56] References Cited
UNITED STATES PATENTS

| 1,895,049 | 1/1933 | Rosenberg.................... | 310/191 |
| 2,058,339 | 10/1936 | Metzger........................ | 310/190 |
| 2,191,074 | 2/1940 | Herrington................... | 310/191 |
| 3,200,276 | 8/1965 | Koper............................ | 310/209 X |
| 2,720,603 | 10/1955 | Mitchel et al................. | 310/99 |
| 3,720,604 | 10/1955 | Mitchel et al................. | 310/99 |
| 3,214,620 | 10/1965 | Smith et al.................... | 310/90 UX |

Primary Examiner—D. F. Duggan
Attorneys—Curt M. Avery, Arthur E. Wilfond, Herbert L. Lerner and Daniel J. Tick ABSTRACT: An electrical machine, with a stator and a rotor of which one has permanent-magnet means for exciting the machine, is provided with a device for temperature compensation of the magnetic stray flux. The device comprises bimetal structure subject to the operational heat of the machine and adapted to temperature-responsively control the stray flux. Preferably, the bimetal structure consists of one or more flat bimetal members disposed in the region of the magnetic stray flux so that temperature increase causes being of the bimetal member which then increases the width of an airgap to reduce the stray flux.

PATENTED OCT 12 1971    3,612,929

DEVICE FOR TEMPERATURE COMPENSATION IN ELECTRICAL MACHINES EXCITED BY PERMANENT MAGNETS

In electrical machines that are excited by permanent magnets, the increasing heating results in the occurrence of a temperature error which causes the magnetic flux to decrease. This requires applying a temperature compensation which can be effected with the aid of a magnetic shunt formed of material having a negative temperature coefficient. Such materials, however, are expensive and involve time-consuming calibrating work. It is therefore an object of my invention to devise a simpler and less costly device for obtaining a temperature compensation in dynamoelectric machines excited by permanent magnets.

To this end, and according to the invention, the magnetic stray flux of the machine is controlled in dependence upon temperature with the aid of bimetal members.

According to a more specific feature, such a temperature control is preferably effected by arranging ferromagnetic bimetal discs or strips in the region of the magnetic stray flux in such a manner that an increase in temperature causes bending of the discs or strips with the result of increasing an air gap and thereby a reduction in stray flux ($\Phi_S$). The alloy composition and the thickness of the bimetal are to be chosen in conjoint consideration of the magnetic pulling force and any occurring centrifugal forces, so that the stray flux will vary in the sense and in the amount required for maintaining the useful flux ($\Phi_N$) substantially constant irrespective of the temperature.

Embodiments of devices according to the invention are illustrated by way of example on the accompanying drawing, in which.

Figure 1:
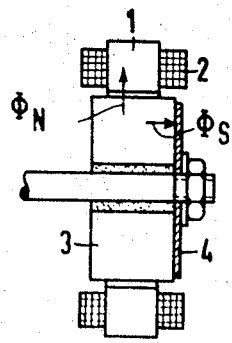
FIG. 1 is a longitudinal section of a small tachometer generator.
Figure 2:
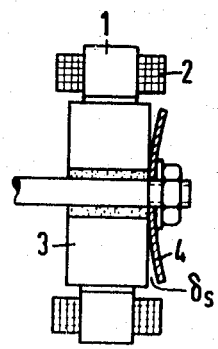
FIG. 2 shows the same generator, also in longitudinal section, with the appertaining bimetal disc in heated condition.
Figure 3:
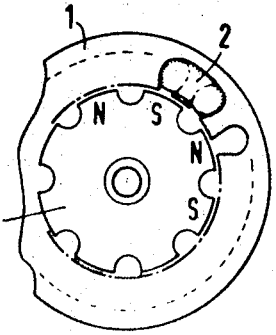
FIG. 3 is a lateral elevation of the same generator.

Referring to FIGS. 1 to 3, there is shown a stator 1 of the tachometer generator with the appertaining stator winding 2. The rotor 3 comprises a built-in permanent magnet or consists of a pole disc structure so magnetized at to have salient poles of alternating north and south polarity. Mounted on one end face of the rotor is a stray flux disc 4 of ferromagnetic bimetal. At low temperature of the machine, the disc 4 rests flat against the face of the rotor and thus forms a magnetic shunt for the permanent-magnet flux from pole to pole. When the temperature increases, the disc 4 progressively bends to a concave shape, as shown in FIG. 2, to that the airgap $\delta_s$ increases in width and the magnetic stray flux $\Phi_S$ decreases.

Figure 6:
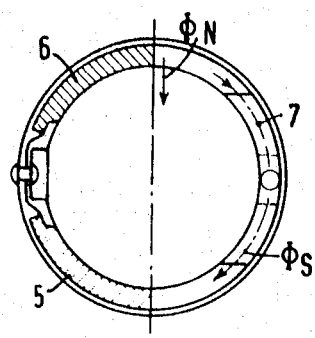
FIG. 6 is a lateral elevation of the stator which forms part of the same motor.
Figure 4:
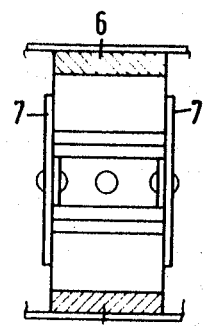
FIGS. 4 and 5 are longitudinal sections through the stator of a miniature direct-current motor in cold and heated condition, respectively.
Figure 5:
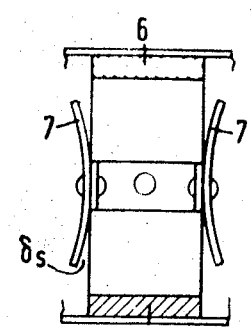

According to FIGS. 4 to 6, the stator 5 of a midget direct-current motor is provided with shell magnets 6 of ferrite. Two stray-flux strips 7 of ferromagnetic bimetal are mounted so as to lie flat against the two end faces of the stator at the locality of the permanent-magnet shells. The strips 7 rest snugly against the front side of the permanent magnets at low temperature of the machine. When the temperature increases, the strips bend away from the stator and thereby increase the airgap $\delta_s$ with the effect of reducing the stray flux $\Phi_S$.

Figure 7:
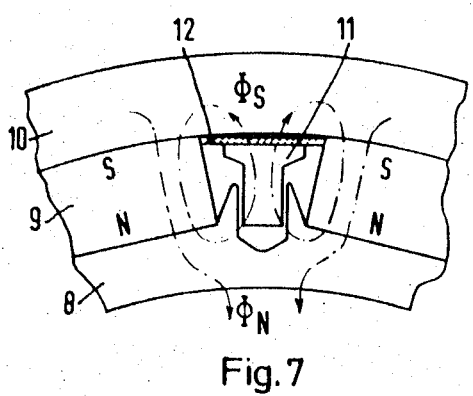
FIGS. 7 and 8 are partial and cross-sectional views of the stator of the large direct-current motor in cold and heated condition, respectively.
Figure 8:
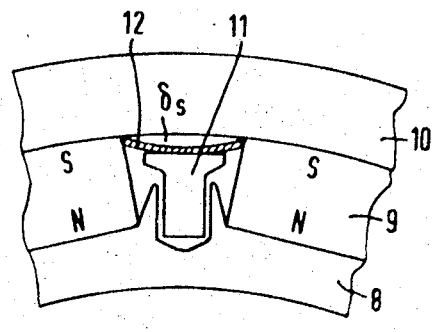

A stator of a comparatively much larger direct-current motor shown in FIGS. 7 and 8 comprises pole pieces 8, permanent-magnet blocks 9 and a stator yoke 10. A stray path member 11 in the form of a plunger-type armature is radially movable between each two successive magnet blocks 9 and is guided by the pole pieces 8 for movement toward and away from the center axis of the machine. A bimetal disc 12 is interposed between each armature 11 and the yoke 10. At low temperature the disc 12 is planar and the armature 11, under the effect of the magnetic forces, is attracted toward the yoke. With increasing temperature the disc 12 will bend to a curved shape and press the armature 11 into the cavity of the pole structure. This increases the width of the airgap $\delta_s$ and the stray flux $\Phi_S$ is correspondingly reduced.

In all of the illustrated embodiments described above, the system is so rated, by a corresponding choice of the material and the dimensions, that the useful flux $\Phi_N$ remains nearly constant independently of changes in temperature.

To those skilled in the art, it will be obvious from a study of this disclosure that with respect to design details or application to various electrical machinery my invention permits of a variety of modifications and hence may be given embodiments other than illustrated and described herein without departing from the essential features of the invention.

I claim:

1. With an electrical machine having a stator member and a rotor member of which one has permanent-magnet means for exciting magnetic flux in said members, the combination of a device for temperature compensation of magnetic stray flux comprising a flat bimetal structure subject to operational heat of the machine, said structure being mounted on at least one of said members in the region of the magnetic stray flux so that the temperature increase causes bending of the bimetal member, said structure forming, when bent, an airgap with said member whose width increases with temperature so as to reduce the stray flux.

2. In a machine according to claim 1, said magnet means comprising permanent magnets built into said rotor, and said bimetal member comprising a disc of ferromagnetic bimetal on at least one end face of said rotor.

3. In a machine according to claim 1, said stator having salient poles and said magnet means being formed of shell-type permanent magnets of ferrite mounted on said stator, said bimetal structure comprising stray-flux strips of ferromagnetic bimetal arranged on at least one end face of said stator.

4. In a machine according to claim 1, said magnet means comprising permanent-magnet blocks built into said stator and having stray paths between said blocks, said stray paths being formed of plunger-type armatures mounted and radially displaceable between each two adjacent ones of said blocks, a stator magnetizable yoke surrounding said blocks, said bimetal structure comprising bimetal plates interposed between said respective armatures and said stator yoke.